(12) United States Patent
Rackovan et al.

(10) Patent No.: US 6,436,496 B1
(45) Date of Patent: Aug. 20, 2002

(54) HALOGEN-FREE, PRINTABLE, MULTILAYERED SHRINK FILMS AND ARTICLES ENCAPSULATED THEREIN

(75) Inventors: Mitchell J. Rackovan, Madison; John Kovalchuk, Painesville, both of OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/187,715

(22) Filed: Nov. 6, 1998

(51) Int. Cl.$^7$ .................. B65D 65/00; B65D 85/00
(52) U.S. Cl. .......... 428/34.9; 428/35.2; 428/35.4; 428/40.1; 428/41.3; 428/41.8; 428/516; 428/520; 206/497; 206/703
(58) Field of Search .................. 428/516, 520, 428/35.2, 35.4, 40.1, 41.3, 41.8, 42.3, 34.9; 206/497, 703

(56) References Cited

U.S. PATENT DOCUMENTS

| | | | | |
|---|---|---|---|---|
| 4,756,415 A | * | 7/1988 | Call | 206/497 |
| 4,971,197 A | * | 11/1990 | Worley | 206/497 |
| 5,735,404 A | * | 4/1998 | Kumakura et al. | 206/497 |
| 5,759,648 A | * | 6/1998 | Idlas | 428/34.9 |
| 5,948,513 A | * | 9/1999 | Turnbull et al. | 428/34.9 |
| 5,962,092 A | * | 10/1999 | Kuo et al. | 428/34.9 |

OTHER PUBLICATIONS

PCT/US99/26222; International Search Report mailed Feb. 16, 2000.*

* cited by examiner

*Primary Examiner*—Rena L. Dye
(74) *Attorney, Agent, or Firm*—Renner Otto Boisselle & Sklar LLP

(57) ABSTRACT

The present invention relates to a halogen-free, multilayered heat shrink film comprising (A) a core layer comprising a copolymer of ethylene or propylene with an alpha olefin and the core having an upper and lower surface, (B) a skin layer on the upper surface of the core layer, wherein the skin layer comprises a polyolefin or polyolefin blend and (C) a printable layer on the lower surface of the core layer, wherein the shrinkage of the film is at least about 30%. The invention also relates to articles, including cylindrical articles such as batteries. The films have good shrinkage and avoids end puckering. Additionally, the films are printable, even with gravure printing. The films and labels produced therefrom may be applied at high speeds and have good heat stability.

18 Claims, 1 Drawing Sheet

HALOGEN-FREE, PRINTABLE, MULTILAYERED SHRINK FILMS AND ARTICLES ENCAPSULATED THEREIN

TECHNICAL FIELD OF THE INVENTION

This invention relates to a halogen-free multilayered shrink films. More specifically, the invention relates to halogen-free multilayered shrink films which are useful in encapsulating cylindrical articles, such as batteries.

BACKGROUND OF THE INVENTION

Shrink film has been used for years to encapsulate articles. The shrink film must be able to shrink sufficiently to provide a smooth consistent coating. Previously, shrink films have been polyolefins and polyolefin blends which were and are used extensively in the food and packaging business to protect and preserve articles, such as food. One problem with polyolefin and polyolefin film blends is the difficulty of printing on the film. For printing to be successful, the films must provide a surface which will accept printing. Additionally the films must have sufficient tensile modulus to withstand the rigors of the printing process. Many polyolefin films do not have the tensile strength to withstand gravure printing.

Shrink film has also been used for encapsulating cylindrical articles such as batteries. Polyvinyl chloride (PVC) films provide acceptable shrinkages of about 40%. However, PVC shrink films have a problem with heat stability. After forming the shrink film, the film should not shrink prematurely. Often, after formation, the film may be exposed to temperatures, such as in transport. It is desired that the shrink film does not shrink until desired. Another problem with PVC shrink films is recent concerns over the environmental impact of PVC film. Concern regarding potentially adverse effect of halogens on the ozone layer has lead to efforts to provide halogen free shrink films.

Batteries are typically encapsulated by shrink films. The film must shrink sufficiently to encase the battery. A problem with encapsulating batteries and any other cylindrical article is end puckering. End puckering occurs when the shrink film does not shrink sufficiently to provide a smooth encapsulating film at the ends of the battery. This film folds over itself and forms a "pucker." This puckering is unacceptable to consumers and therefore the manufacturer.

Battery encapsulating is done at very high speeds. The speed of the labelling is often more that 700 labels applied per minute. It is difficult for typical shrink film labels to work under such high speed conditions.

It is desirable to have a film which provides high shrinkages, e.g. shrinkages of greater than 25%. It is also desirable to have the films be halogen free. The desired film would smoothly encapsulate the articles and avoid end puckering. Finally, it is desirable to have of films which are printable and able to be applied at high speeds.

U.S. Pat. No. 4,194,039, issued to Mueller, relates to a multi-layered polyolefin shrink film. The film has three layers comprising a core layer of a blend of ethylene-vinyl acetate copolymer with ethylene-butylene copolymer and each skin layer of ethylene-propylene copolymer.

U.S. Pat. No. 4,196,240, issued to Lustig et al, relates to heat shrinkable multilayer packaging film of blended copolymers and elastomers. The multilayer film includes a first outer layer comprising a blend of propylene-ethylene copolymer having a high isotactic molecular structure with less than about 6% by weight being ethylene and having a melt flow of from about 1.5 to about 18 decigrams per minute; and (butene-1)-ethylene copolymer having a high isotactic molecular structure with less than about 10% by weight ethylene and having a melt flow of about 0.1 to about 5.0 decigrams per minute, and a thermoplastic elastomer selected from the group consisting of ethylene-propylene copolymers and ethylene-propylene diene terpolymers, the ratio of the weight of the propylene-ethylene copolymer to the (butene-1)-ethylene copolymer being from 2:1 to about 1:2 and the thermoplastic elastomer being present from about 10% to about 50% by weight. The multilayer film also has an outer layer comprising an ethylene-(butene-1) copolymer having a melt flow of from about 0.1 to about 1 decigram per minute, having a density of from about 0.916 to about 0.920 gram per cubic centimeter, and being a linear polymer. The multilayer film is also biaxially oriented.

U.S. Pat. No. 4,207,363, issued to Lustig et al, relates to flexible heat-shrinkable multilayer film for packaging primal meat. The multilayer film includes (1) a first outer layer comprising a blend of a propylene-ethylene copolymer, a (butene-1)-ethylene copolymer and a thermoplastic elastomer selected from the group consisting of ethylene-propylene copolymers and ethylene-propylene diene terpolymers; (2) a first core layer connected to the first outer layer and being capable of being stretched during the biaxial orientation of the multilayer film and comprising an extrudable adhesive; (3) a second core layer connected to the first core layer and serving as an oxygen barrier to prevent the meat cut from spoilage and being compatible to the biaxial orientation and heat shrinking of the film; and (4) a second outer layer comprising an ethylene vinyl acetate copolymer. The multilayer film is biaxially oriented.

U.S. Pat. No. 5,190,609, issued to Lin et al, relates to stable pressure sensitive shrink label technique. The heat shrink labels are formed from a polyolefin, such as a polypropylene, and have a permanent acrylic pressure sensitive adhesive on one side thereof and may be mounted on a release coated backing strip. A metallized layer and open style graphics may be applied to the labels and the graphics may be protected by varnish or a second layer of heat shrinkable polyolefin material.

U.S. Pat. No. 5,443,895, issued to Peiffer et al, relates to multilayer transparent polyolefin film for application in shrink labeling. The heat shrinkable film comprises a base layer prepared from a polypropylene-containing polymer and a hydrocarbon resin. The base layer contains about 5 to 40% by weight of a polypropylene homopolymer, 0 to about 30% by weight of a hydrogenated hydrocarbon resin having a softening point in the range from about 80 to 125° C. and from about 30 to 95% by weight of a random ethylene-propylene copolymer.

U.S. Pat. No. 5,494,717, issued to Peiffer et al, relates to matte, biaxially oriented, multilayer polypropylene film of high shrinkage, and processes of making the same. The multilayer polypropylene film comprises at least one base layer containing a propylene polymer and a propylene polymer mixture in at least one outer layer which comprises a mixture or a blend. The mixture contains copolymers and terpolymers of alpha olefins containing 2 to about 10 carbon atoms and high density polyethylene.

U.S. Pat. No. 5,691,043, issued to Keller et al, relates to uniaxially shrinkable biaxially oriented polypropylene film and it method of preparation. The polypropylene film comprises a polypropylene-containing core layer comprising at least 70% by weight of said multilayer film and at least one polyolefin-containing skin layer adjacent to the core layer. The core layer is prepared by biaxially orienting a coextrudate and thereafter orienting said coextrudate by stretching 10 to 40% in the machine direction. The core layer contains isotactic polypropylene and a modifier which reduces the crystallinity of the polypropylene by increasing chain imperfections or reducing isotacticity of the polypropylene containing core. The modifiers include atactic polypropylene, syndiotactic polypropylene, ethylene-propylene copolymer, propylene-butylene copolymer, ethylene-propylene-butylene terpolymer and linear low density polyethylene. The skin layers are selected from the group consisting of polypropylene, ethylene-propylene copolymer, polyethylene and ethylene-propylene-butylene terpolymer.

SUMMARY OF THE INVENTION

The present invention relates to a halogen-free, multilayered heat shrink film comprising (A) a core layer comprising a copolymer of ethylene or propylene with an alpha olefin and the core having an upper and lower surface, (B) a skin layer on the upper surface of the core layer, wherein the skin layer comprises a polyolefin or polyolefin blend and (C) a printable layer on the lower surface of the core layer, wherein the shrinkage of the film is at least about 30%. The invention also relates to articles, including cylindrical articles such as batteries. The films have good shrinkage and avoid end puckering. Additionally, the films are printable, even with gravure printing. The films and labels produced therefrom may be applied at high speeds and have good heat stability, e.g., they don't shrink prematurely, even at temperatures approaching 170° F.

DETAILED DESCRIPTION OF THE INVENTION

The present invention relates to the use of multilayer shrink films and labels produced therefrom. The films and labels have a shrinkage of greater than 30%, or greater than 35%, or even greater than 40%. The shrinkage is determined at 270 degrees F. and by ASTM D 1204. The preferred shrink temperature range is from 250 to 270 degrees F. These films also, in one aspect, may be oriented in the machine direction, e.g. uniaxially oriented. The film typically has a thickness from about 0.5 to about 12, or from about 1 to about 8, or from about 1.5 to about 5 mils. Here and elsewhere in the specification and claims, the range and ratio limits may be combined.

As described above, the multilayered shrink films have a core layer which is comprised of a copolymer of ethylene or propylene with an alpha-olefin. The core layer comprises a major portion of the shrink film. Typically, the core layer has a thickness from about 0.6 to about 4, or from about 0.8 to about 3, or from about 1 to about 2.5, or from about 1.2 to about 2 mils thick. The films have sufficient strength to be printed by flexographic and gravure printing. These films generally have a Young's modulus from about 150,000 to about 500,000, or from about 175,000 to about 400,000, or from about 200,000 to about 300,000 psi.

Young's modulus is determined by ASTM D 882. In one embodiment, the core layer is free of vinyl acetate resins.

The core layer comprises at least one copolymer of ethylene or propylene with an alpha-olefin. The copolymers generally have a melt flow of about 2 to about 8, or from about 3 to about 5 g/10 min. The copolymer typically comprises from about 2% to about 30%, or from about 5% to about 25%, or from about 10% to about 20% by weight of the alpha-olefin. The alpha olefins have from about 3 to about 12, or from about 4 to about 8 carbon atoms. The alpha olefins include 1-butene, 1-pentene, 1-hexene, 1-heptene, 1-octene, etc. Preferred alpha olefins are 1-butene and 1-hexene, with 1-butene more preferred.

For example, the copolymers may be obtained by copolymerization of ethylene or propylene with an alpha olefin, such as 1-butene, using single-site metallocene catalysts. Such copolymers are available from Union Carbide. Polypropylene SRD4-127 is a random copolymer of propylene and 1-butene containing from about 8% by weight of butene. This polymer is available from Union Carbide and is characterized as having a melt flow of 8 g/10 min. Similar copolymers include SRD4-126, SRD4-128, SRD4-130, and SRD4-131. Polypropylene SRD4-104 is a random copolymer of propylene and 1-butene containing about 11% butene. This polymer is available from Union Carbide and is characterized as having a melt flow of 5.0 g/10 min. Another useful propylene and 1-butene copolymer is available commercially from Union Carbide under the trade designation DS4D05. This copolymer has 14% butylene and a melt flow of about 5.5 g/10 min.

In another embodiment, the core layer comprises a blend of one or more of the above copolymers with a polyolefin. The polyolefin may be one of the above described copolymers, in which case two or more of the above polymers are blended together. The polyolefin may be a homopolymer or copolymer, preferably an olefin homopolymer. The olefins used to make the polyolefins have from 2 to about 16, or from 3 to about 12, or from about 4 to about 8 carbon atoms. The olefins include ethylene, propylene, butylene, pentene, hexene, heptene, octene, nonene, decene, etc. The polyolefins typically have a melt flow from about 2 to about 10, or from about 3 to about 8, or from about 4 to about 6 g/10 min.

In one embodiment, the polyolefin is a homopolymer of propylene or butylene. Polypropylene and poly-1-butene may be used as the polyolefin. An example of a propylene homopolymer useful in the present invention is the homopolymer identified as 5C97/5A97 available from Union Carbide. This homopolymer is characterized as having a melt flow of 3.9 g/10 min. Examples of a butylene homopolymers are identified as 0200 (melt flow of 1.8 g/10 min) and 0300 (melt flow of 4.0 g/10 min) and available from Shell Chemical Company.

In one embodiment, the polyolefin is a copolymer. The copolymer may be a propylene-ethylene or a butylene-ethylene copolymer. In one embodiment, the polyolefins are propylene-ethylene copolymers containing up to about 10% or less of ethylene and more often less than about 6% ethylenic content. Ethylenic contents of from about 0.2% to about 10% are useful. Preferably, the ethylene content is from about 3% to about 10% by weight and more preferably from about 3% to about 6% by weight. Examples of the types of propylene copolymers which are useful in the present invention include Polypropylene DS 6D20, a propylene random copolymer which contains about 3.2% by weight of ethylene and is available from Union Carbide. This polymer has a melt flow of 1.9 g/10 min. Polypropylene DS 6D81 is a polypropylene random copolymer available from Union Carbide which contains 5.5% by weight of ethylene. This random copolymer is characterized as having a melt flow of 4.5 g/10 min. When the copolymer is a butylene copolymer, it typically includes ethylene at a level of about 0.5% to about 12%, or of about 1% to about 10%, or from about 1.5% to about 8%. Examples of useful butylene-ethylene copolymers are available from Shell Chemical Company as DP 8220, having an ethylene content of 2% and a melt flow of 2.0 g/10 min, and DP 8310, having an ethylene content of 6% and a melt flow of 3.2 g/10 min.

When the core layer is a blend, the amount of the polyolefin comprises from about 5% to about 55%, or from about 15% to about 50%, or from about 20% to about 45% by weight of the polymer of the core layer. The copolymer of ethylene or propylene with an alpha olefin makes up the balance of the polymers in the core layer. In one embodiment, the core layer is free of ethylene homopolymer. In another embodiment, the core layer is free of ethylene propylene copolymers.

The following table contains examples of formlations for the core layer of the present films and labels. Here and throughtout the specification and claims the amounts are by weight, unless clearly indicated otherwise.

|  | C1 | C2 | C3 | C4 | C5 | C6 | C7 | C8 | C9 | C10 |
|---|---|---|---|---|---|---|---|---|---|---|
| Propylene-butylene copolymer A[1] | 100 | — | 90 | — | 75 | — | 65 | — | 55 | 80 |
| Propylene-butylene copolymer B[2] | — | 100 | — | 85 | — | 70 | — | 65 | — | — |
| Polypropylene[3] | — | — | 10 | — | — | — | — | — | — | 10 |
| Polybutylene[4] | — | — | — | — | 25 | 10 | — | 25 | — | 10 |
| Butylene copolymer[5] | — | — | — | 15 | — | 20 | 35 | 10 | 45 | — |

[1]DS4D05 (14% butylene) of Union Carbide
[2]SRD4-127 (8% butylene) of Union Carbide
[3]5A97 of Union Carbide
[4]0200 of Shell Chemical
[5]8220 of Shell Chemical The following table contains further examples of core layer formulations.

In this table, DS4D05 refers to propylene-butylene copolymer DS4D05 (14% butylene) of Union Carbide and 8220 refers to butylene copolymer 8220 of Shell Chemical. The cores are extrusion cast and uniaxially oriented at a ratio of 5.5:1.

|  | C11 | C12 | C13 | C14 | C15 | C16 | C17 |
|---|---|---|---|---|---|---|---|
| Core Formula | 100% 4D05 | 95% 4D05 5% 8220 | 90% 4D05 10% 8220 | 80% 4D05 20% 8220 | 70% 4D05 30% 8220 | 60% 4D05 40% 8220 | 55% 4D05 45% 8220 |
| Tensile Modulus | 321,000 psi | 287,000 psi | 247,000 psi | 225,000 psi | 198,000 psi | 185,000 psi | 169,000 psi |

The multilayer shrink film has a skin layer on the upper surface of the core layer. The skin layer is composed of a polyolefin or polyolefin blend. The melt index of the polyolefin or blend is generally in the range of 4 to 12, or of about 5 to about 8 g/10 min. The polyolefin may be one or more of the above described homopolymers or copolymers, such as ethylene-propylene copolymers or the ethylene or propylene copolymers with an alpha olefin. The copolymers have been described above.

When a polyolefin blend is used for the skin layer, in one embodiment, the skin layer comprises a major amount of one or more of the above described olefin homopolymer and a minor amount of one or more of the above described copolymer of ethylene or propylene with an alpha olefin. Typically the olefin homopolymer is present in an amount from about 55% to about 95%, or from about 60% to about 85%, or from about 80% by weight of the polymers of the skin layer. The olefin copolymers make up the balance of the skin layer. In one embodiment, the skin layer is free of ethylene homopolymers. In another embodiment, the skin layer is free of ethylene propylene copolymers.

The following table illustrates formulations for the skin layer.

|  | S1 | S2 | S3 | S4 | S5 | S6 | S7 | S8 | S9 | S10 | S11 |
|---|---|---|---|---|---|---|---|---|---|---|---|
| Polypropylene[1] | 100 |  |  | 85 | 20 | 80 | 70 |  | 85 | 65 | 70 |
| Polybutylene[2] |  | 100 |  |  | 60 |  |  | 70 |  |  |  |
| Propylene-butylene copolymer[3] |  |  | 100 |  | 20 | 15 | 30 |  | 15 | 35 | 15 |
| Ethylene-propylene copolymer[4] |  |  |  | 15 |  | 5 |  | 30 |  |  | 15 |

[1]5A97 of Union Carbide
[2]0200 of Shell Chemical
[3]DS4D05 (14% butylene) of Union Carbide
[4]DS6D20 (3.2% ethylene) of Union Carbide The multilayer shrink film has a printable layer on the lower surface of the core layer. The printable layer may be prepared by any printable material. In one embodiment, the printable layer is a blend of a polyolefin and a soft polar additive. The soft polar additives (SPA) of the olefin SPA blends generally comprise random copolymers of an olefin and one or more polar moiety. A presently preferred soft polar additive is ethylene vinyl acetate copolymer (EVA). In particular, a commercially available EVA which is useful contains 19% vinyl acetate and has the following characteristics: tensile modulus (1% secant), 5300 psi; ultimate tensile strength, 2150 psi; ultimate elongation, 730%; hardness, 87 Shore A. Although EVA is presently most preferred, alternative materials useful as soft polar additives in the olefin-SPA blends include ethylene methyl acrylate (EMA) and acrylonitrile butadiene rubber. These materials disclosed for use in the printable layer comprise, in one embodiment, physical blends of (1) polypropylene or copolymers of propylene and ethylene, as described above, and (2) ethylene vinyl acetate (EVA) in weight ratios ranging from 50/50 to 60/40. The soft polar additive and the olefin blends are described in U.S. Pat. No. 5,709,937 issued to Adams et al and U.S. Pat. No. 5,585,193 issued to Josephy et al, the disclosure of which is incorporated by reference.

Examples of polymers which may be used to form the print layer include the above polyolefins and polymers such as polyethylene methyl acrylate, poly ethylene vinyl acetate, polyethylene ethyl acrylate, polymethylmethacrylates, acrylonitrile butadiene styrene polymer, nylon, polybutylene, polystyrene, polyurethane, polysulfone, polyvinylidene chloride, polypropylene, polypropylene copolymers, polycarbonate, polymethylpentene, styrene maleic anhydride polymer, styrene acrylonitrile polymer, ionomers based on sodium or zinc salts of ethylene/methylacrylic, cellulosics, fluoroplastics, polyacrylonitriles, and thermoplastic polyesters. In one embodiment, the third layer is a blend of about 25% to 75%, or about 50% of polyethylene vinyl acetate, such as UE 631-04 available from Equistar, and blend of about 25% to 75%, or about 50% of polypropylene homopolymer, such as Union Carbide 5A97 (4 melt flow).

As mentioned above, the composites of the present invention comprise at least one print layer comprising an olefin-SPA blend comprising from about 30% to about 60% by weight of SPA. In other embodiments, the olefin-SPA blend used in the print layer will contain from about 40% to about 60% by weight of SPA, and in another embodiment, about 50% by weight of SPA.

The following table illustrates formulations for the printable layer.

|  | P1 | P2 | P3 | P4 | P5 | P6 |
|---|---|---|---|---|---|---|
| Polypropylene[1] | 50 | — | 60 | 40 | — | 55 |
| Ethylene-propylene copolymer[2] | — | 50 | — | — | 55 | — |
| EVA[3] | 50 | 50 | 40 | 60 | 45 | 45 |

[1]5A97 of Shell Chemical
[2]DS6D20 (3.2% ethylene) of Union Carbide
[3]ethylene vinyl acetate copolymer (18% vinyl acetate) of AT Polymer of Toronto, Canada As noted above, the core layer is relatively thick compared to the outer, e.g. printable and skin layers. Thus, the core layer may be about 2 to 20 times as thick as each of the outer layers. Examples of thickness ratios of the core to the outer layers combined include 90:10, 80:20, 70:30 etc. The thickness ratios of the printable skin layer to the core and then to the outer skin layer are 5–20:90–60:20–5, or 10–15:70–90:15–10. Thickness ratios for the three layered films include 5:90:5, 10:80:10, 15:70:15, 20:60:20, etc. The two skin layers do not have to be of equal thickness.

BRIEF DESCRIPTION OF THE DRAWINGS

The films and labels of the present invention are further illustrated in reference to the attached drawings.

Figure 1:
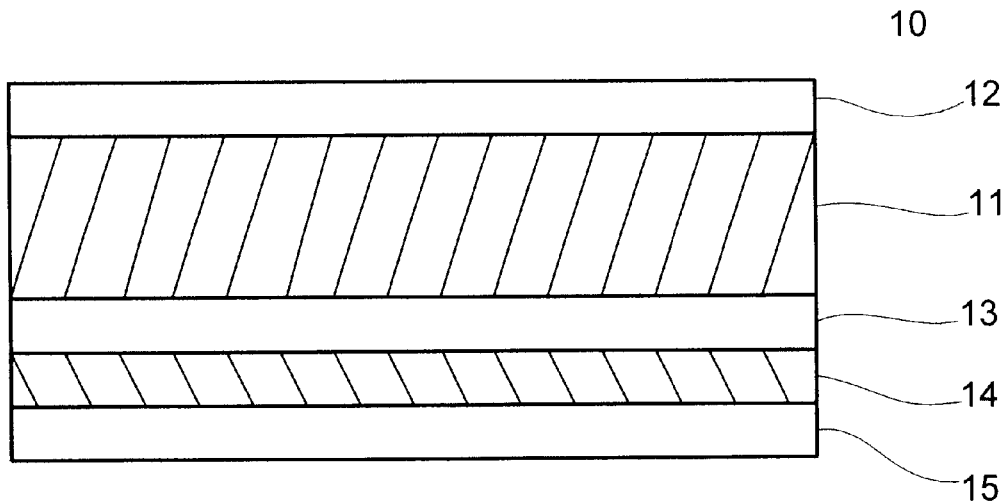
FIG. 1 is a cross-sectional area of a label of the present invention.
Figure 2:
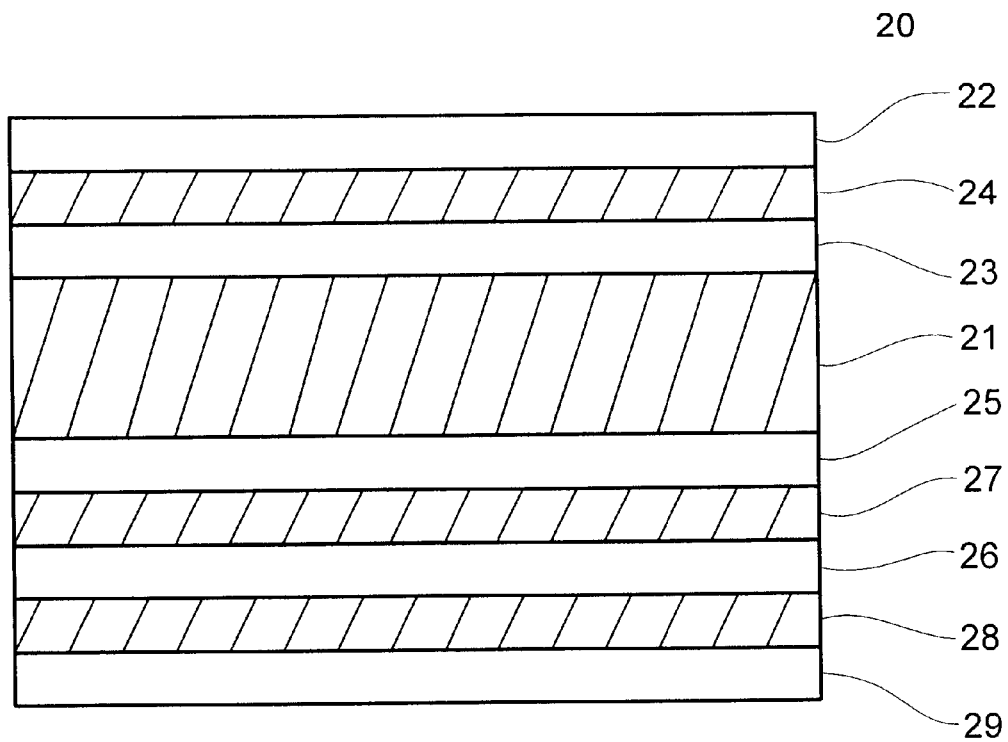

Label 10 is a coextrudate which comprises core layer 11, skin layer 12 and print layer 13. Print layer 13 is adhered to pressure sensitive adhesive 14. Pressure sensitive adhesive 14 is releasably bonded to release liner 15.

It is also contemplated that the present film may have one or more of the skin layers and one or more of the print layers. These layers are attached by coextruding a tie layer between each of the skins. The tie layers may be any polymer which improves the adhesion of the layers. Examples of suitable tie layers include Platamid, available from Elf Atochem, and CXA, Bynel, or Plexar series of tie layers available from DuPont Chemical.

The film with tie layers is further illustrated by FIG. 20. Label 20 has core layer 21 attached to inner skin layer 23.

Inner skin layer 23 is attached to outer skin layer 22 by tie layer 24. The opposite side of core layer 21 is attached to an inner print layer 25. The inner print layer 25 is attached to tie layer 27 and to outer print layer 26. Outer print layer 26 is bonded to pressure sensitive adhesive 28 which in turn is releasably bonded to release liner 29.

The following labels contain examples of multilayered films of the present invention. These films are prepared by coextrusion and uxiaxially oriented to a stretch ratio of 5.5:1.

|  | L1 | L2 | L3 | L4 | L5 | L6 | L7 | L8 | L9 | L10 |
|---|---|---|---|---|---|---|---|---|---|---|
| Skin layer | S1 | S6 | S1 | S4 | S1 | S7 | S8 | S1 | S6 | S6 |
| Core layer | C1 | C5 | C7 | C1 | C5 | C7 | C1 | C5 | C7 | C7 |
| Printable layer | P1 | P1 | P1 | P1 | P1 | P1 | P1 | P1 | P1 | P1 |

The multilayer shrink film may be prepared by means known to those in the art. The film may be prepared by co-extrusion, extrusion coating or lamination. The following table contains examples of multilayer shrink films which are useful in the present invention. These films are generally prepared by coextrusion of the three layers.

As discussed above the films may be directionally oriented. This is accomplished by stretching the film as is known to those in the art. The multilayer films of the present invention typically have a stretch ratio from about 2 to about 9, or from about 3.5 to about 7, or from about 4 to about 6. The processes for extruding films and orient them are described in U.S. Pat. No. 5,709,937, issued to Adams et al, and U.S. Pat. No. 5,435,936, issued to Rackovan et al, the disclosures of which are incorporated by reference for these teachings.

As described above, the films are useful in many shrink film applications. The films may be converted to a label by adding a pressure sensitive adhesive to the printable side of the film, e.g., the side with the soft polar additives. Print indicia may be placed onto the film prior to adding a pressure sensitive adhesive. The adhesive may be any of those known to those skilled in the art.

The pressure sensitive adhesive may be any solvent or emulsion based pressure sensitive adhesive such as acrylic or rubber based pressure sensitive adhesives. Typically, the adhesive is placed onto the film at a coat weight of about 10 to about 40, or from about 20 to about 25 grams/m$^2$. An example of a particularly useful adhesive is S2001 available from Avery Chemicals.

The labels of the present invention may be prepared by coextruding a skin layer, core layer and print layer such as those described above. This film is then printed by gavure printing and transfer laminated to a pressure sensitive adhesive on a release liner such as the silicone treated paper.

The labels are particularly useful in encapsulating articles such as batteries. By way of illustration, the above film is laminated to a pressure sensitive adhesive with liner. The film is die cut to form individual labels and the matrix surrounding the labels are removed. The resulting labels are then applied to a battery and then shrink wrapped in a heat tunnel. The temperature of the heat tunnel is approximately 250–260° F. The labels of the present invention encapsulate the battery as well without end puckering. When using these labels to encapsulate batteries, it is also understood that the labels may further include circuitry such as that used to determine the strength of the battery charge. Circuitry may be internal of the label, e.g., on the adhesive side of the label or on the outer surface of the label such as circuitry which would then be further covered with another film such as those described above, or a varnish to protect it from damage. Encapsulates for batteries and methods for encapsulating batteries along with description of some circuitry for battery labels is described in U.S. Pat. No. 5,190,609, issued to Lin et al. This patent in incorporated by reference for those teachings.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayer packaging label comprising:
   i. a halogen-free, multilayered heat shrink film comprising (A) a core layer comprising at least 45% by weight of copolymer of ethylene or propylene with a $C_3$–$C_{12}$ alpha olefin and 0–55% by weight of a polyolefin homopolymer or copolymer, said core having an upper and lower surface; (B) a skin layer on the upper surface of the core layer, wherein the skin layer comprises a polyolefin or polyolefin blend and (C) a print layer comprising a blend of a polyolefin and a soft polar additive, said print layer having an upper and lower surface, wherein the upper surface of the print layer contacts the lower surface of the core layer and wherein the lower surface of the print layer contains print indicia thereon; wherein the shrinkage of the film is at least about 30%;
   ii. a pressure sensitive adhesive layer having an upper and lower surface, wherein the upper surface of the pressure sensitive adhesive layer contacts the lower surface of the print layer;
   iii. a release liner in contact with the lower surface of the pressure sensitive adhesive layer.

2. The label of claim 1 wherein (A) is a copolymer of ethylene or propylene and butene or hexene.

3. The label of claim 2 wherein (A) is a copolymer of ethylene or propylene and butene or hexene.

4. The label of claim 1 wherein the core layer comprises a copolymer of ethylene or propylene and an olefin homopolymer.

5. The label of claim 4 wherein the olefin homopolymer is propylene or butylene homopolymer.

6. The label of claim 1 wherein (B) is polypropylene, polybutene, or a propylene and butene copolymer.

7. The label of claim 1 wherein (B) is a polyolefin blend of a polyolefin homopolymer and a copolymer of ethylene or propylene and an alpha olefin.

8. The label of claim 1 wherein (B) is a polyolefin blend of a propylene homopolymer and a copolymer of propylene and an alpha olefin.

9. The label of claim 1 wherein the polyolefin is an ethylene or propylene homopolymer or a copolymer of ethylene and propylene.

10. An article encapsulated with a multilayer heat shrink label of claim 9.

11. The article of claim 10, wherein the article is a battery.

12. An article encapsulated with a multilayer heat shrink label of claim 1.

13. The article of claim 12, wherein the article is a battery.

14. A multilayer packaging label comprising:
   i. a halogen-free, multilayered heat shrink film comprising (A) a core layer comprising a blend of (1) 45–95% by weight of a copolymer of ethylene or propylene with a $C_3$–$C_{12}$ alpha olefin and (2) 5–55% by weight of a homopolymer of an olefin, and having an upper and lower surface, (B) a skin layer on the upper surface of the core layer, wherein the skin layer comprises a polyolefin homopolymer or a blend of a polyolefin homopolymer and a copolymer of ethylene or propylene and an alpha olefin and (C) a printable layer having an upper and lower surface, wherein the upper surface of the printable layer contacts the lower surface of the core layer, wherein the lower surface of the printable layer contains print indicia thereon, and wherein the printable layer comprises a blend of 40–70% by weight of a polyolefin and 30–60% by weight of a soft polar additive, wherein the shrinkage of the film is at least about 35%;
   ii. a pressure sensitive adhesive layer having an upper and lower surface, wherering the upper surface of the pressure sensitive adhesive layer contacts the lower surface of the print layer;
   iii. a release liner in contact with the lower surface of the pressure sensitive adhesive layer.

15. The layer of claim 14 wherein the copolymer of (1) is a propylene and butene copolymer.

16. The layer of claim 14 wherein the homopolymer of (2) is a polybutene.

17. The layer of claim 14 wherein the polyolefin homopolymer of (B) is polypropylene or polybutene and the copolymer is a propylene butene copolymer.

18. The layer of claim 14 wherein the polyolefin of (C) is a polypropylene or polyethylene and the soft polar additive is ethylene vinyl acetate.

* * * * *